Figure 4:
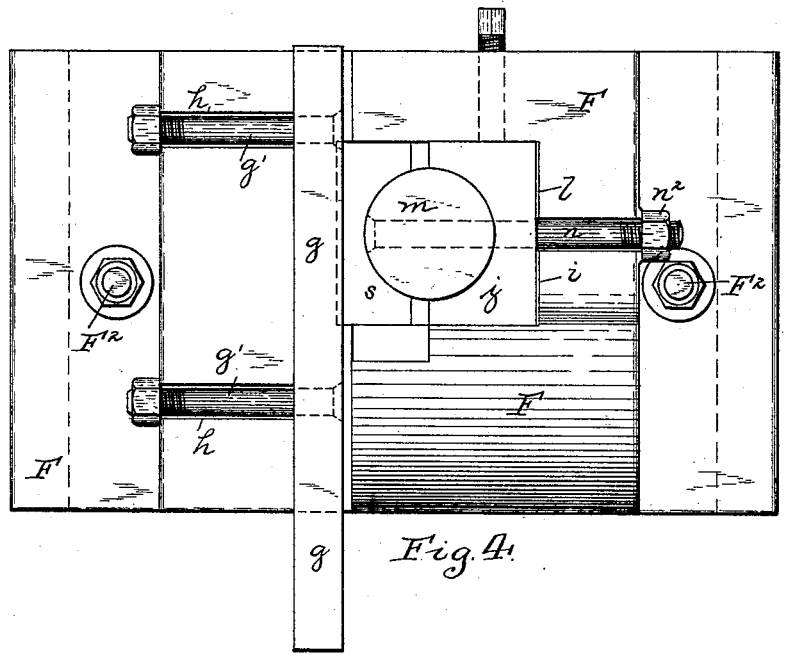

(No Model.) 3 Sheets—Sheet 1.
D. McGARY.
MACHINE FOR SHEARING METAL.
No. 496,167. Patented Apr. 25, 1893.
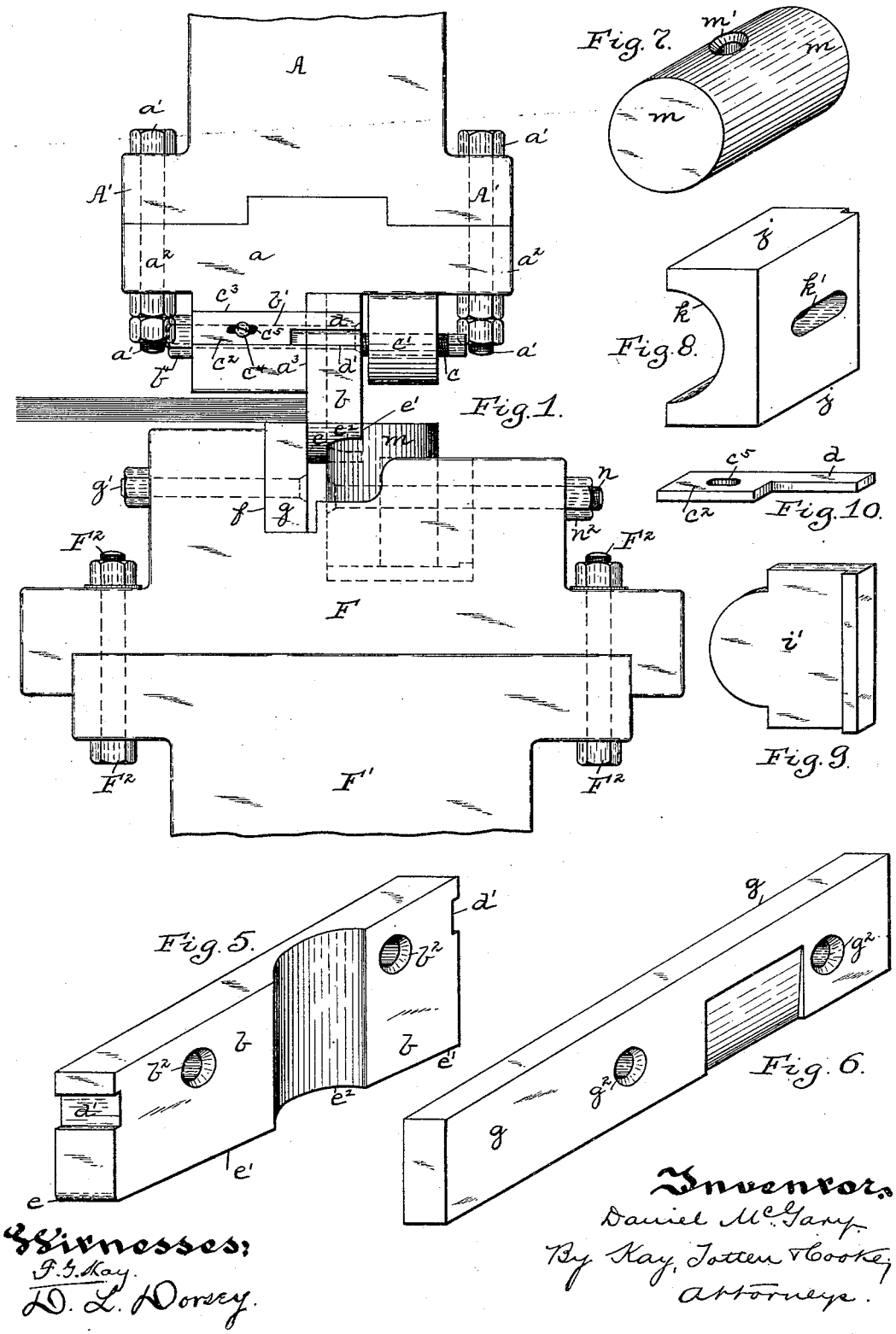
Witnesses:
F. G. Kay.
D. L. Dorsey.
Inventor,
Daniel McGary,
By Kay, Totten & Cooke,
Attorneys.

(No Model.) 3 Sheets—Sheet 2.

D. McGARY.
MACHINE FOR SHEARING METAL.

No. 496,167. Patented Apr. 25, 1893.

Witnesses:
F. G. Kay.
D. L. Dorsey.

Inventor
Daniel McGary
By Kay, Totten & Cooke
Attorneys (No Model.) 3 Sheets—Sheet 3.

D. McGARY.
MACHINE FOR SHEARING METAL.

No. 496,167. Patented Apr. 25, 1893.

Witnesses:
F. G. Kay.
D. L. Dorsey.

Inventor:
Daniel McGary.
By Kay, Totten & Hooke,
Attorneys.

THE NORRIS PETERS CO., PHOTO-LITHO., WASHINGTON, D. C.

UNITED STATES PATENT OFFICE.

DANIEL McGARY, OF PITTSBURG, PENNSYLVANIA.

MACHINE FOR SHEARING METAL.

SPECIFICATION forming part of Letters Patent No. 496,167, dated April 25, 1893.

Application filed February 17, 1893. Serial No. 462,687. (No model.)

*To all whom it may concern:*

Be it known that I, DANIEL MCGARY, a resident of Pittsburg, in the county of Allegheny and State of Pennsylvania, have invented a new and useful Improvement in Machines for Shearing Metal; and I do hereby declare the following to be a full, clear, and exact description thereof.

My invention relates to machines for shearing metal, its object being to provide a machine in which the metal may be sheared to produce a straight or rounded end thereon, as may be required, by means of the same knives, thus dispensing with the employment of two separate machines where it is desired to produce hoop iron, for instance, with one straight and one rounded end. The demand for hoop iron having one straight end and one rounded end has compelled all hoop iron manufacturers to meet this demand. Accordingly, to produce hoop iron in this form it has been customary heretofore to first cut the long lengths of hoop iron as they come from the rolls into approximately the required lengths for use. As this cutting was done by means of the ordinary crocodile, or other forms of shears which produce the hoop iron with straight ends, in order to round one of said ends it was necessary to carry the bundle, so cut into lengths with straight ends, to a second shearing machine, where, by inserting one of said ends between suitable knives, a portion thereof was cut off to produce rounded ends thereon. This double handling of the bundles increased largely the time and labor, and, consequently, the cost of manufacture of hoop iron, while at the same time such an operation required a great amount of floor space, which is an important feature in hoop iron mills where the product has to be rolled to such great lengths.

My invention comprises, generally stated, a shearing machine having a reciprocating knife provided with a straight cutting edge and a recessed cutting edge, a lower stationary knife having a straight cutting edge and a projecting knife having a cutting edge corresponding in shape to the recess formed by said recessed cutting edge and adapted to enter said recess, whereby upon inserting the metal between the straight edges of said knives the straight end is formed thereon, and upon inserting it between said recessed cutting edge and said projecting knife a rounded end is formed thereon. My invention further comprises certain details of construction and combination of parts, all of which will be fully hereinafter set forth and claimed.

Figure 2:
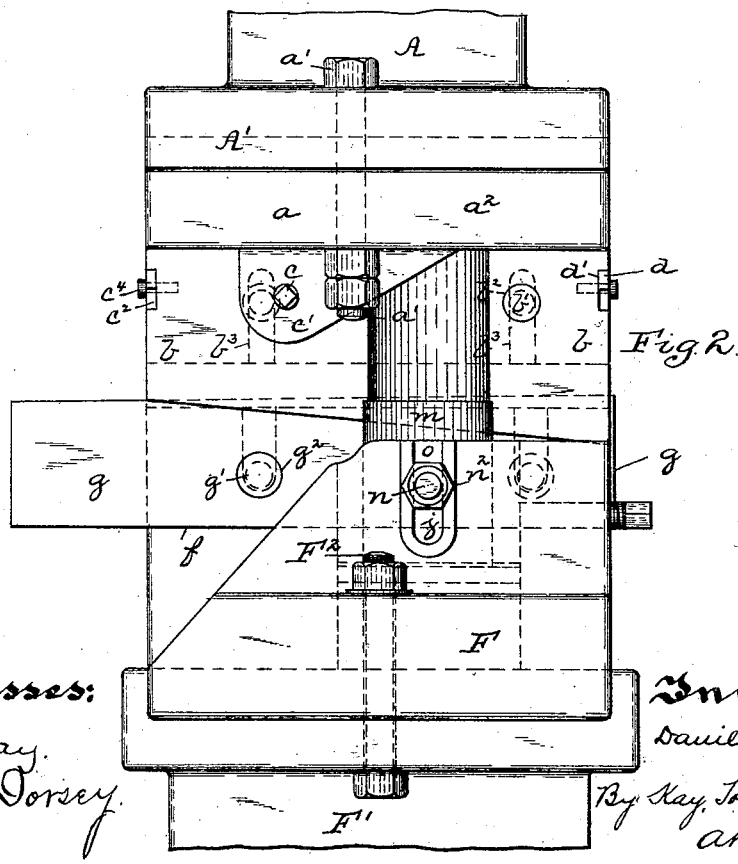
Figure 3:
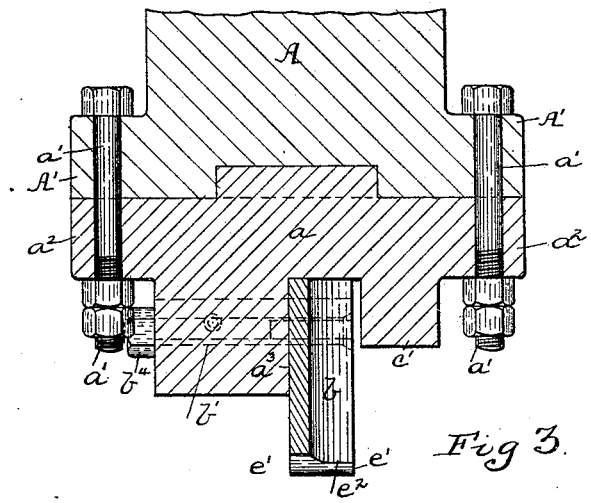
Figure 11:
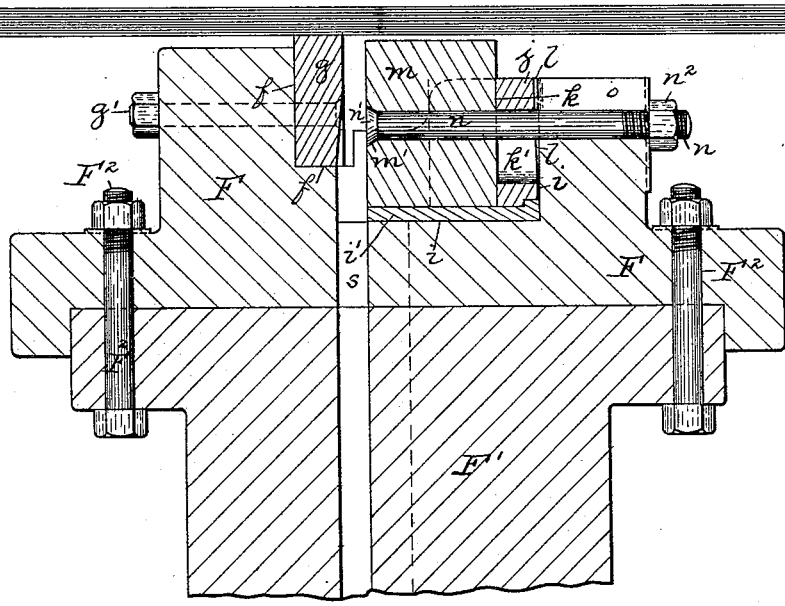
Figure 12:
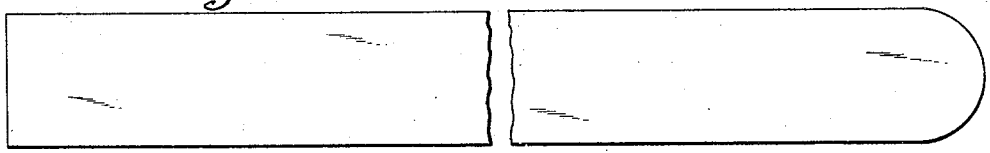

In the accompanying drawings Figure 1 is a side view of my improved shearing apparatus showing the upper knife in its lowest position and the cutting of the metal. Fig. 2 is a front view thereof. Fig. 3 is a vertical section thereof showing the upper knife elevated. Fig. 4 is a plan view showing the plunger and upper knife removed. Fig. 5 is a perspective view of the upper knife. Fig. 6 is a like view of the lower knife. Fig. 7 is a like view of the cutting plug. Fig. 8 is a like view of the plug holder. Fig. 9 is a like view of a suitable plate under the plug and plug holder. Fig. 10 is a like view of the keeper for retaining said upper knife in position. Fig. 11 is a view of a section of hoop iron; and Fig. 12 is a view of the blank.

Like letters indicate like parts in each.

As my invention in no way relates to the manner of reciprocating the upper knife, I have not deemed it necessary to illustrate the mechanism for operating the plunger A to which the upper block $a$ is secured by means of bolts $a'$ passing through lugs $A'$ on said plunger A and lugs $a^2$ on said upper block $a$. Within the seat $a^3$ in said upper block $a$ is the upper or reciprocating knife $b$, said knife being secured within said seat $a^3$ by means of the bolts $b'$, said bolts passing through countersunk openings $b^2$ in said knife and through the open end slots $b^3$ in the upper block $a$, and having the nuts $b^4$ secured thereto. By the employment of the slots $b^3$ for the reception of the bolts $b'$ said knife may be adjusted at different heights, as may be found necessary. A set screw $c$ passing through the lug $c'$ on said block $a$ is adapted to press against the knife $b$ to further aid in holding it in position. As a further precaution against the slipping of the knife $b$, in case the bolts $b'$ become loose, the keepers $c^2$ are employed, said keepers being arranged on each side of the upper block $a$ and secured within seats $c^3$ formed for them in said block by means of the set screws $c^4$ passing through slots $c^5$ in said keepers. The fingers $d$ of said keepers are adapted to enter the seats or recesses $d'$ formed in the ends of said knife $b$ and thus assist in supporting the same. As the cutting edge of the knife $b$ wears away, or is ground down, it is necessary to lower said knife, whereupon by removing said keepers and reversing the position of the fingers $d$ the said fingers are adapted to support said knife as before, but in a lower position. The knife $b$ is formed with the straight cutting edge $e$ on one side thereof, and the recessed cutting edge $e'$ on the opposite side thereof, said recessed cutting edge $e'$ being formed by the recess $e^2$ formed in said knife. This recessed cutting edge $e'$ may be circular, angular, or other shape, the recess $e^2$ corresponding in shape thereto. I have illustrated the recessed cutting edge $e'$ as circular in form, as my invention is herein described in connection with the manufacture of hoop iron with rounded ends.

The bottom block F is supported upon the foundation block F' and is secured thereto by means of the bolts $F^2$. Within the seat $f$ formed in said bottom block F is secured the stationary knife $g$, said knife being held in position by means of the bolts $g'$ passing through the counter-sunk openings $g^2$ formed in said knife $g$ and through the open slots $h$ formed in said bottom block F, whereby said knife $g$ may be adjusted at different heights as may be desired. At the bottom of the seat $i$ formed within the bottom block F is the plate $i'$ which serves as a support for the plug holder $j$. This plug holder $j$, as shown in Fig. 8, is formed with the concave recess $k$ and the elongated opening or slot $k'$ formed in the back wall thereof, and said plug holder is preferably slightly wedge-shaped, the said walls thereof tapering from the top to the base of greater width, so that when the said plug holder is inserted within the seat $i$ and wedges $l$ are forced down between the tapering walls of said plug holder, and the inner walls of said seat $i$, the jars and shocks to which said plug holder is subjected will not act to unseat the same, but only act to lock it more securely in place. The plug $m$, for this part will be termed a "plug" throughout the specification, is preferably cylindrical in form and adapted to fit snugly within the semi-circular recess $k$, but extends slightly above said plug holder $j$. A counter-sunk opening $m'$ is formed in said plug $m$ passing transversely through the same, and through said opening passes the bolt $n$, the head $n'$ thereof fitting within said counter-sunk opening $m'$. The bolt $n$ also passes through the slot $k'$ in the plug holder $j$ and thence through the slot $o$ in the block F. The nut $n^2$ on the end of the bolt $n$ retains said bolt in a rigid position and holds the plug $m$ at any desired height. The plug $m$ is made cylindrical in form in order that when the edge projecting beyond the plug holder $j$, and the one which has been doing the work, has become worn and dull, by removing said plug and reversing it so as to bring the cutting edge which has been within the recess $k$ into position to do the cutting, a sharp cutting edge is obtained without changing the plug. It is evident, also, that by inverting the said plug $m$, two other cutting edges are available, so that in every plug there are four cutting edges which may be used. The plug $m$, like the knives $b$ and $g$, is made of a high grade of tool steel and may be ground in the ordinary manner when they become worn or dull. The slot $k'$ in the holder $j$ allows for the adjusting of the plug $m$ at a higher elevation when the length of said plug is reduced by successive grindings of the cutting edges.

When my improved shearing apparatus is in use in connection with the shearing of hoop iron, it is conveniently arranged just at one side of the rolls, so that as the long lengths of metal are rolled they are in close proximity to the shearing machine and do not need to be carried any great distance. To produce the proper lengths of hoop iron with one square and one rounded end, the long lengths in bundles are first sheared to remove the crop ends, so that the bundle will present a number of even ends with straight edges. This is done by inserting the lengths between the straight edge of the lower cutting knife $g$ and the straight edge of the reciprocating knife $b$, care being taken not to insert the said lengths far enough within the knives for said lengths to be acted upon by the recessed cutting edge of the upper knife, whereupon the descending knife $b$ in conjunction with the lower knife $g$ cuts off from said long lengths of metal the crop ends, producing straight even ends on the long lengths. The operators then carry the long lengths along a suitable table or support in front of and in line with the machine and bring said straight ends into contact with a gage secured at a predetermined point on said table at the proper distance from the shearing knife to produce the hoop-iron of the required lengths. With the straight ends of said long lengths in contact with the gage, the operators then swing the bundle over until the point at which the next cut is to be made is directly over the top of the plug $m$ and under the recess $e^2$ of the knife $b$, and in order that the metal is always sure to be brought to this point and not beyond, a suitable gage, not shown, may be employed. By the use of this gage the operators by simply throwing the bundles against this gage are assured that the cut will be made at the proper point. With the metal in this position, upon the descent of the knife $b$ the recessed cutting edge of the plug $e'$, in conjunction with the correspondingly shaped projecting cutting edge of the plug $m$, will produce rounded ends upon the lengths of metal, while at the same time the straight edge $d'$ of said upper knife $b$ and the lower knife $g$ will produce straight ends on the remaining long lengths of the bundle to be further cut into smaller lengths. Blanks in the form shown in Fig. 12 will be cut from the metal by this operation, and said blanks will fall down through the opening s in the bottom block F. The remaining long lengths of hoop-iron with straight ends are carried as before along the table until they are brought into contact with the gage, and when in contact therewith the bundle is again thrown over to the gage in position to be again acted upon by the recessed edge e' of the knife b with the same result as before. In this manner by successive cuts, the long lengths of hoop-iron are reduced to smaller lengths of the required size having one of their ends straight and the other end rounded. The bundles so cut are ready to be banded together and carried to the ware-house for shipment, as they have been cut with the straight and rounded ends by one operation, so doing away with the extra handling of the bundles and the employment of an extra shearing machine.

It is apparent that by the use of the above described apparatus, the hoop-iron may be produced with both ends straight, if so desired.

What I claim as my invention, and desire to secure by Letters Patent, is—

1. In a machine for shearing metal the combination of a reciprocating knife provided with a straight cutting edge and a recessed cutting edge, a stationary knife having a straight cutting edge, and a projecting plug having a cutting edge corresponding in shape to said recessed cutting edge and adapted to enter the recess formed thereby, substantially as and for the purposes set forth.

2. In a machine for shearing metal, the combination of a reciprocating knife provided with a straight cutting edge and a circular cutting edge, a stationary knife having a straight cutting edge, and a circular plug having a cutting edge adapted to coincide with said circular cutting edge, substantially as and for the purposes set forth.

3. In a machine for shearing metal, the combination of a reciprocating knife provided with a straight cutting edge and a circular cutting edge, a stationary knife having a straight cutting edge, and a circular plug having a cutting edge at each end thereof adapted to coincide with said circular cutting edge, substantially as and for the purposes set forth.

4. In a machine for shearing metal, the combination of a reciprocating knife provided with a straight cutting edge and a recessed cutting edge, a stationary knife having a straight cutting edge, a plug having a cutting edge adapted to coincide with said recessed cutting edge, and a holder for receiving said plug and means for securing said plug in place, substantially as and for the purposes set forth.

5. In a machine for shearing metal, the combination of a reciprocating knife provided with a straight cutting edge, and a recessed cutting edge, a stationary knife having a straight cutting edge, a plug having a cutting edge adapted to coincide with said recessed cutting edge, a holder for receiving said plug and means for securing said plug therein, said holder having tapering sides and adapted to fit within a seat formed in the bottom block, substantially as and for the purposes set forth.

6. In a machine for shearing metal, the combination of a knife provided with a straight cutting edge and a recessed cutting edge, a stationary knife having a straight cutting edge, a plug having a cutting edge adapted to coincide with said recessed cutting edge, a holder for receiving said plug, and a bolt passing through openings formed in said plug and holder to secure said plug therein, substantially as and for the purposes set forth.

7. In a machine for shearing metal, the combination of a knife provided with a straight cutting edge and a recessed cutting edge, a circular plug having a cutting edge adapted to coincide with said recessed cutting edge, a holder for receiving said plug, and a bolt passing through said plug and through a slot in said holder to secure said plug therein, substantially as and for the purposes set forth.

8. In a machine for shearing metal, the combination of a knife provided with a straight cutting edge and a circular cutting edge, a circular plug having a cutting edge adapted to coincide with said circular cutting edge, a holder having a semi-circular seat to receive said plug and means for securing said plug therein, substantially as and for the purposes set forth.

9. In a machine for shearing metal, the combination with the top block, of a reciprocating knife secured thereto, said block and said knife having seats formed therein, keepers secured within the seats formed in said block and having projections adapted to enter the seats formed in said knife, substantially as and for the purposes set forth.

In testimony whereof I, the said DANIEL MCGARY, have hereunto set my hand.

DANIEL McGARY.

Witnesses:
ROBT. D. TOTTEN,
J. N. COOKE.